United States Patent [19]

Schull

[11] 4,306,678
[45] Dec. 22, 1981

[54] HOLDER SYSTEM FOR A SELF-SERVICE CARWASH GUN

[76] Inventor: Harold M. Schull, 623 Perrin Dr., Arabi, La. 70032

[21] Appl. No.: 59,310

[22] Filed: Jul. 20, 1979

[51] Int. Cl.³ .............................................. B05B 15/06
[52] U.S. Cl. ....................................... 239/1; 239/283; 222/538; 248/75; 134/198
[58] Field of Search ............... 239/273, 280, 282, 283; 222/530, 538; 248/75, 76, 79, 89; 134/45, 123, 172, 198

[56] References Cited

U.S. PATENT DOCUMENTS

| | | | |
|---|---|---|---|
| 3,400,725 | 9/1968 | Miller et al. | 134/123 X |
| 3,672,617 | 6/1972 | Neyendorf | 248/75 |
| 4,154,400 | 5/1979 | Wehunt | 239/282 |
| 4,174,810 | 11/1979 | Torbett | 239/283 |

Primary Examiner—Robert W. Saifer
Attorney, Agent, or Firm—C. Emmett Pugh & Associates

[57] ABSTRACT

A holder for a coin-operated carwash wand containing a spring-biased, friction brake triggered by the pressure of fluid jetting from the wand. The brake prevents the wand or gun from being inadvertently jetted out of the holder should the user mistakenly insert his coins before the gun is removed from the holder. The frictional resistance engagement of the brake is sufficient to overcome the jetting force but is low enough to allow the user to pull the gun out of the holder even when the brake is on. The holder is also spring-mounted to its wall bracket so that it can rotate 90° in the event the wand hose becomes snagged on a portion of the automobile being serviced, thus allowing the wand to be pulled out of the holder rather than having the holder ripped off the wall or the hose system otherwise damaged.

13 Claims, 5 Drawing Figures

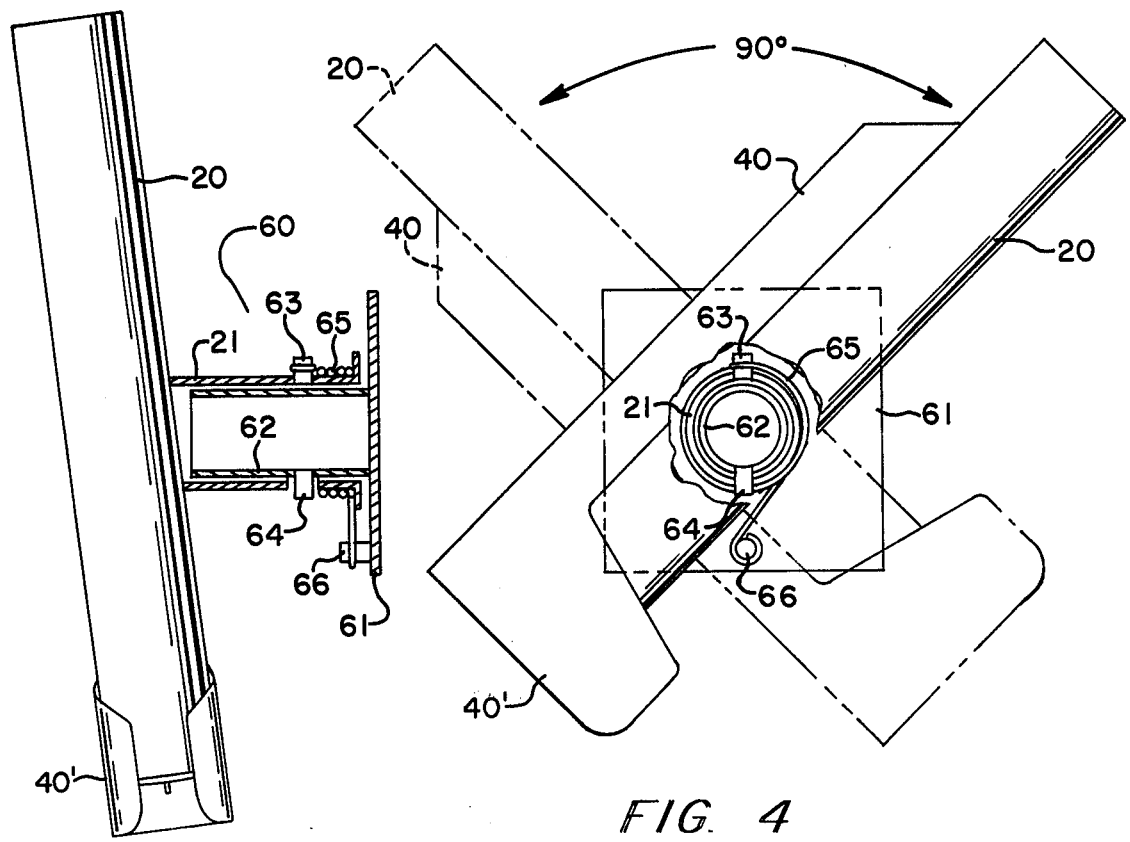
FIG. 3
FIG. 4
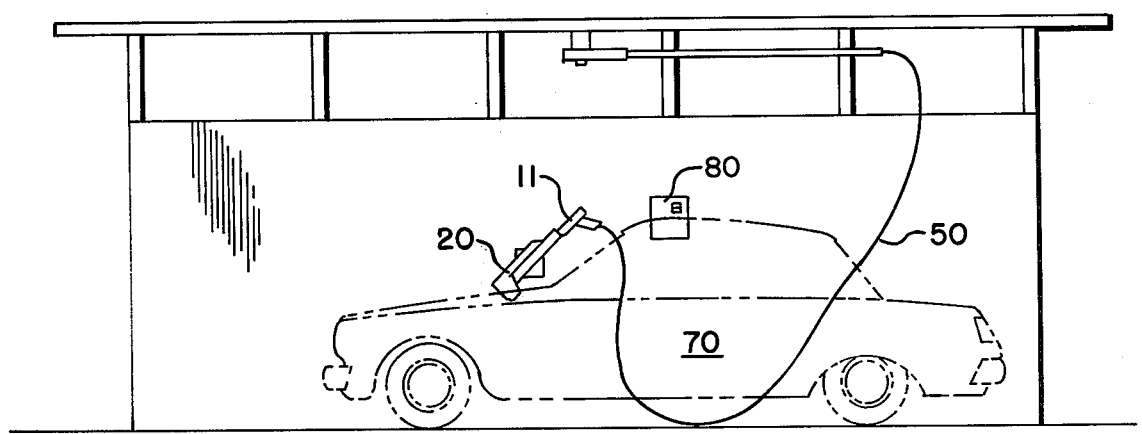
FIG. 5

HOLDER SYSTEM FOR A SELF-SERVICE CARWASH GUN

BACKGROUND OF THE INVENTION

1. Field of the Invention

The present invention relates to holders used to holster the wands utilized in coin-operated, self-service carwashes. More specifically, the present invention relates to the problem of "flying wand" or keeping the wand trapped in the holder so that fluid jetting from the wand nozzle when the wand is activated by the deposit of a coin will not cause the wand to suddenly fly out of the holder and strike the user. The present invention also relates to the problem of flexibility in the holder mounting to a vertical surface so that the assembly will not be damaged should the wand hose become snagged on a portion of the automobile as the car moves out of the carwash stand.

2. Description of the Prior Art

In coin-operated carwash stands the user is supposed to remove the washing wand or gun from its holder before depositing the coins, because when the coins are deposited the washing gun is usually automatically activated. If the user mistakenly deposits the coins prior to removing the wand, in most prior art holders, the gun is jetted or rocketed out of the holder under the pressure of the fluid then shooting out of the nozzle possibly causing injury to the user standing next to the holder.

One attempted solution to the problem has been to use a trigger actuated gun which controls a valve in the gun, but such wands or guns are very expensive in comparison to the standard wands and the inclusion of the trigger and valve produces a further source of maintenance problems.

There are to applicant's knowledge no known prior art patents directly related to the principles of utilizing either a fluid pressure actuated, mechanical friction-type brake in a carwash wand holder to trap the wand or a spring operated swivel mounting for the carwash wand holder.

Hangers to prevent fuel delivery nozzles from contamination from dirt and rain water with hooking systems to lock them into the hangers are known—e.g. U.S. Pat. No. 3,672,617 issued to E. Neyendorf, June 27, 1972 and U.S. Pat. No. 4,098,437, issued to E. Reinke, July 4, 1978—but these do not relate in any way to the problem of anchoring a carwash wand in its holder in order to prevent "flying wand".

Two basic safety holder designs are known in the carwash industry to prevent "flying wand". One involves the use of a manual release lever to fixedly trap the wand in the holder and the other involves the use of a special safety wand with a bell nozzle resting in two encircling clamps, with side slots on the holder. The former holder must be manipulated with two hands in order to release the wand, one pulling on the wand and the other manipulating the release lever. The latter holder relies on the principle of the bell nozzle hitting back up against one of the encircling holder clamps to keep the wand in place when fluid jets from the nozzle. This latter assembly is thus limited to the use of a specially designed safety wand. Additionally, because of the narrow side slots or openings in both encircling holder clamps through which the wand rod must be passed in order to be released while the wand is pressure jammed against the clamps, this latter device is also difficult for the user to manipulate. Both devices are also more costly than the present invention. Both of these devices are also rigidly mounted, so that if the carwash wand hose becomes snagged on a portion of the automobile after being washed while the car is being driven away, the wand and the holder can be bent or broken.

Prior patents showing various forms of devices having a spring-biased support to allow for resilient rotation about an axis under some externally applied force, usually an impacting one, are out-line below:

| Patent No. | Patentee(s) | Issue Date | Type of Device |
|---|---|---|---|
| 2,616,649 | Grosse | Nov. 4, 1952 | rear view mirror |
| 2,719,687 | Hiscock | Oct. 4, 1955 | fishing rod holder |
| 2,787,433 | Slavsky, et al | Apr. 2, 1957 | sign |
| 3,658,284 | Hassle | Apr. 25, 1972 | mail box |
| 4,093,171 | Mengo, Sr. | June 6, 1979 | fishing rod holder |

However none of these devices are of the type of device of the present invention, and are not analogous to the present invention.

SUMMARY DISCUSSION OF THE INVENTION

In coin-operated carwash stands the user is supposed to remove the washing wand or gun from its holder before depositing the coins, because when the coins are deposited the washing gun is usually automatically activated. If the user mistakenly deposits the coins prior to removing the wand, in most prior art holders, the gun is jetted or rocketed out of the holder under the pressure of the fluid then shooting out the nozzle, possibly causing injury to the user standing next to the holder.

One attempted solution to the problem has been to use a trigger actuated gun which controls a valve in the gun, but such wands or guns are very expensive in comparison to the standard wands and the inclusion of the trigger and valve produces a further source of maintenance problems.

The present invention utilizes in its preferred embodiment a brake assembly attached to the carwash wand holder which frictionally engages the actuated wand or gun when it is turned "on". This assembly in its preferred embodiment comprises a rod running along one exterior side of the holder attached to two brake pawls. One pawl extends over the bottom end of the holder. The other pawl extends down inside the holder and is also attached to a spring sitting beneath the rod on the outside of the holder. The entire rod and brake assembly is protected by a unit cover fitting onto the holder.

A short rubber hose tapered on both ends fits onto the wand as a sleeve near the nozzle end. If the user mistakenly deposits a coin before removing the wand from the holder, the jet spray of fluid from the nozzle will hit the brake pawl sitting over the holder bottom, forcing it outwardly. This pulls back on the brake connecting rod, which in turn pulls the brake pawl inside the holder down onto and against the rubber sleeve on the wand, trapping the wand inside the holder with its frictional engagement. The wand can still, however, be pulled out manually by the user with only one hand against the frictional engagement of the brake, after which the brake assembly will spring back to its original position.

The holder in its preferred embodiment is mounted to a wall or machine by means of a cylindrical mounting bracket tube connected to a wall or machine bracket. A semi-circular spring inside the bracket returns the holder to its proper position should it be swiveled around by pull exerted on the carwash wand hose. The cylindrical mounting bracket allows for an exemplary 90° of release.

Applicant's invention thus provides:

1. A foolproof, simple spring mechanism that can be used with any carwash wand to trap the wand in the holder upon activation of the fluid spray and yet allow the user to remove the wand easily with one hand; and 2. A simple system whereby free rotation of the holder is permitted should the wand hose snag on a moving automobile, thus preventing wand and wand holder damage.

The wand holder design of the present invention is also less expensive to manufacture than the prior art.

A further advantage of the present invention is that the holder can be used to hold and support the gun or wand during use even when activated, if such is desired.

BRIEF DESCRIPTION OF THE DRAWINGS

For a further understanding of the nature and objects of the present invention, reference should be had to the following detailed description taken in conjunction with the accompanying drawings in which like parts are given like reference numerals and wherein:

FIG. 3 is an external side view of the wand holder attached to the holder mounting bracket in which a cross-sectional side view of the mounting bracket is shown;

FIG. 4 is a front side view, partially cutaway, of the wand holder attached to the mounting bracket showing the mounting bracket spring and illustrating the 90° of rotation permitted by the mounting bracket assembly; and FIG. 5 is a general illustration of an automobile positioned in the automatic carwash bay showing the attachment of the carwash wand and wand holder, and the placement of the carwash wand hose.

DETAILED DESCRIPTION OF THE PREFERRED EMBODIMENT

Figure 1:
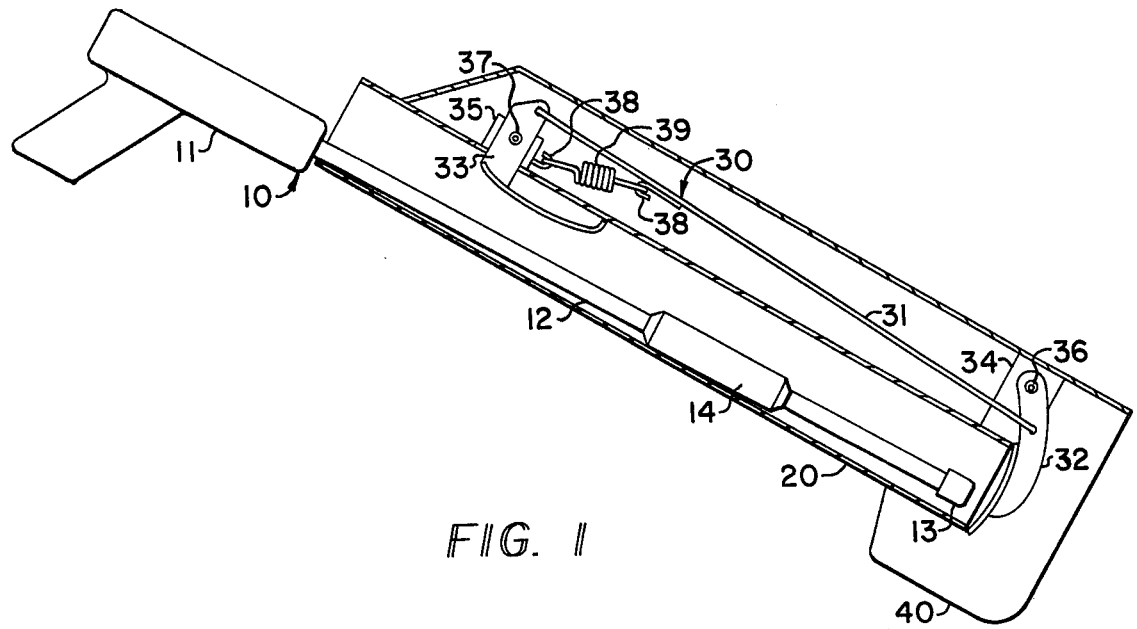
FIG. 1 is a side, cross-sectional view of the preferred embodiment of the carwash wand holder of the present invention showing the brake assembly in the usual "off" disposition.
Figure 2:
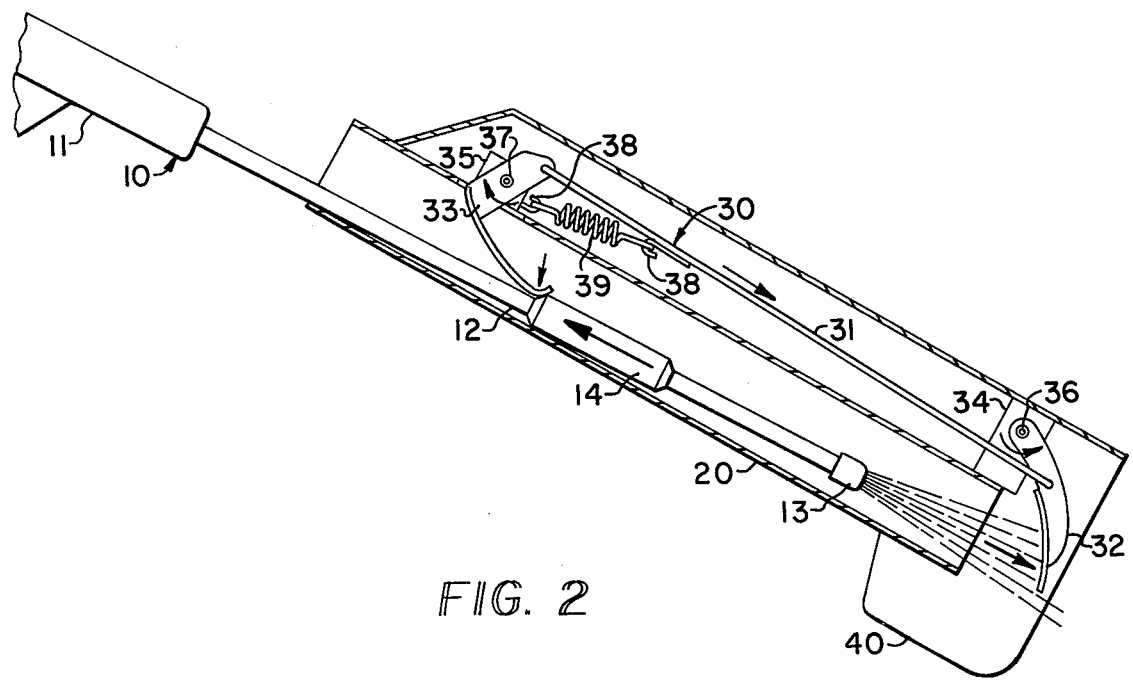
FIG. 2 is a similar view to FIG. 1 but showing the brake assembly in the "lock" or braking position with the carwash wand being activated and spraying fluid under pressure.

FIGS. 1 and 2 illustrate the carwash gun or wand 10 inside the carwash wand holder 20 with the preferred embodiment of the brake assembly 30 of the present invention attached. The carwash wand 10 itself is composed of the handle 11, the wand shaft 12 and the nozzle 13. An exemplary six-ply high pressure rubber hose, friction sleeve 14 tapered at both ends is attached around the carwash wand shaft 12 approximately three-quarters of the way down the shaft 12 towards the nozzle 13. The carwash wand holder 20 supports the gun 10 when not in use and is formed of a hollow cylindrical metal tube open at both ends having a slot on its upper side and toward its upper end, which tube 20 is usually mounted at an inclined angle substantially off both the horizontal and the vertical, for example at 45° as generally shown in FIG. 5.

Attached to the upper side of the wand holder 20 is a mounting bracket 34 positioned at the bottom end of the wand holder 20 and a mounting bracket 35 positioned about a quarter of the way down from the top of the wand holder 20. A brake pawl 32 is attached to the lower mounting bracket 34 by means of pin 36, and another brake pawl 33 is attached to the upper mounting bracket 35 by means of a pin 37. A rod 31 connects both brake pawls 32 and 33, fitted to each by insertion and bending of the respective rod end into a hole in the pawl. Due to the respective positions of these holes in each brake pawl, the rod 31 slopes slightly downward from the upper brake pawl 33 to the lower brake pawl 32.

Both brake pawls 32 and 33 include a rectangularly-shaped arm welded to a circular blade. The lower brake pawl 32 is located on its mounting bracket 34 at the bottom end of the wand holder tube 20 so that its cupped blade projects down over and covers the open bottom end of the wand holder tube 20, forming a moveable extended surface positioned at the lower end portion of the tube 20 below and in front of the nozzle 13 of the gun 10 when the gun 10 is in the support tube 20. The upper brake pawl 33 is positioned on its mounting bracket 35 so that the rectangular portion of the upper brake pawl 33 protrudes slightly down inside the wand holder tube 20 through the slot 21 cut in the tube 20, and the blade portion of the upper brake pawl 33 runs laterally along the inside of the wand holder tube 20 just beneath and parallel to the upper exterior side of the wand holder tube 20.

A coiled spring 39, with the two ends being straight and projecting outward from either end of the spring 39, is attached at one end to the upper mounting bracket 35 by means of a hook 38 and to the rod 31 by means of another hook 38 welded to the rod 31.

The entire brake assembly 30 and its mechanical linkages are covered by a unit cover 40 which is attached to the exterior of the wand holder tube 20. The cover 40 includes two side extensions 40' about the bottom end sides of the tube 20 to block any fluid jetting out the tube 20 after impinging on the cupped surface of brake pawl 32.

As illustrated in FIGS. 2 and 5, if the user places a coin in the coinbox 80 of the automatic carwash machine before removing the wand 10 from the wand holder tube 20, thus turning on the apparatus and causing a stream of fluid to jet from the nozzle 13 of the wand 10, the fluid (note arrow) will hit against the lower brake pawl 32, forcing it outwardly. This outward movement of the lower brake pawl 32 in turn pulls downward on the connecting rod 31 which, in turn, pulls downward on the rectangular portion of the upper brake pawl 33. The upper brake pawl 33 pivots on its mounting pin 37, forcing the upper brake pawl blade down against the tapered end of the rubber sleeve 14 wrapped around the wand shaft 12. The brake pawl 32 and its associated mechanical linkages and brake pawl 33 thus serve as a form of force sensing and applying means, and in response to its actions the wand 10 is trapped against the interior bottom side of the wand holder tube 20 and prevented from flying out of the wand holder tube 20 and possibly hitting the user.

By taking hold of the wand handle 11 and pulling on it, the wand can be removed from the holder support tube 20. The frictional resistance of the brake pawl 33 against the sleeve 14, and the specifics of the mechanical linkage system 30 which produces it, is designed so that the strength of the usual pull of the user is sufficient to overcome it, but is great enough to overcome the jetting action of the fluid coming out of the wand 10. A typical force of the maximum frictional resistance engagement of the brake pawl 33 and the sleeve 14 before the wand 10 is released is for example five pounds of pull force.

The rubber sleeve 14 then is no longer in contact with the upper brake pawl blade and the jetting action against the lower brake pawl will be removed and the upper brake pawl 33 will spring back to its original position due to the recoiling action of the spring 39 to which it is attached. The user can then freely remove the wand 10 from the wand holder tube 20. When the upper brake pawl 33 springs back into its original position when the wand 10 is removed, the connecting rod 31 is automatically pulled back upwards, pulling the lower brake pawl 32 with it back into its original position.

The assembly is then ready for use again when the wand 10 is reinserted into the wand holder tube 20. The unit cover 40 keeps the entire mechanism from being damaged by movement of the wand holder tube 20, or from being contaminated by fluid jetting from the wand 10 while the car washing machine is in use.

As illustrated in FIG. 3, the wand holder tube 20 is connected to the wall mounting bracket 60 by means of a short, hollow, open-ended cylinder 21 welded to the exterior of the wand holder tube 20. This cylinder 21 fits over the projecting cylinder 62 welded and running perpendicular to the vertical plate portion 61 of the mounting bracket 60. A bolt 64 attached to the mounting bracket cylinder 62 projects through a slot cut in the wand tube cylinder 21. A screw 63 screws down through both cylinders 21 and 62, and holds one end of the spring coil 65 in place. The spring coil 65 winds around the exterior of the wand tube cylinder 21 and attaches at its other end to the screw post 66 welded to the mounting bracket plate 61.

As illustrated in FIG. 4, the projection of the bolt 64 through the wand tube cylinder 21 allows the wand tube cylinder 21 a free rotation or pivoting of for example 90° about a horizontal axis around the mounting bracket cylinder 62, if the wand hose 50 (seen in FIG. 5) is snagged on a portion of the automobile 70 being serviced and the wand holder tube 20 is thus pulled toward the left from the perspective of FIG. 5. When the wand hose 50 is freed from the automobile 70 or the wand 10 is pulled out of the holder, pressure on the wand holder tube 20 is released, and the wand holder tube 20 will spring back to its original position as the result of the action of the spring coil 65, as illustrated in FIG. 4. The spring coil 65 could for example be either a metal wire, a flexible metal band, or a similar material producing a spring action.

Although a frictional engagement type braking system is preferred in the present invention, it of course is possible to use a positive locking system instead, or to use a more sophisticated, for example electronic, force sensing and force applying system than the preferred straight-forward, reliable and relatively inexpensive mechanical system illustrated.

Because varying embodiments may be made within the scope of the invention concept herein taught and because many modifications may be made in the embodiment detailed herein in accordance with the descriptive requirements of the law, it is to be understood that the details herein are to be interpreted as illustrative and not in a limiting sense.

What is claimed is:

1. A holder system for a car wash gun, having a handle, a shaft and a fluid nozzle, for washing cars and other vehicles and the like with a fluid jetting action from the gun, comprising:

support means for holding and supporting the gun when out of use;

movable brake means associated with said support means for moving into and out of braking engagement with the gun when in the holder; and force sensing and applying means associated with said support means and said brake means for detecting when fluid is flowing from the gun when the gun is in said support means and for actuating said movable brake means against the gun to prevent jetting of the gun from said support means if and when the fluid jetting action occurs when the gun is in said support means.

2. The holder system of claim 1 wherein said force sensing and applying means is a mechanical linkage system comprising:

a movable extended surface positioned at the lower part of said support means below and in front of the position the fluid jet nozzle of the gun occupies when the gun is in said support means, said extended surface being movable away from the nozzle under the jetting force of any fluid in a direction away from the nozzle;

mechanical linkage elements connected to said extended surface and to said brake means; the movement of said extended surface means as a result of any fluid jetting from the gun nozzle moving said brake means through said linkage elements into frictional resistance engagement with the gun to prevent it from jetting out of said support means.

3. The holder system of claim 2 wherein the gun has a friction sleeve about its shaft and wherein said brake means frictionally engages the sleeve as the gun attempts to fly out of said support means under the action of the fluid it emits.

4. The holder system of claim 2 wherein said brake means includes a curved member which abuts and contacts the gun with the underside of its curved surface to engage and hold the gun in said support means when fluid is jetting from the gun.

5. The holder system of claim 2 wherein said support means comprises a tube opened at both ends, and inclined at an angle with its longitudinal axis substantially off the horizontal.

6. The holder system of claim 5 wherein said movable extended surface is located at the bottom portion of said tube.

7. The holder system of claim 6 wherein the inner surface of said movable extended surface is cupped.

8. The holder system of claim 2 wherein the retarding force of said frictional resistance engagement is sufficient to overcome the jetting action of the gun when it is on and in said support means but less than the force which can usually be applied by the typical human user of the car wash gun.

9. The holder system of claim 8 wherein the retarding force of said frictional resistance engagement is on the order of five pounds.

10. The holder system of claim 2 wherein said support means includes mounting means at least generally horizontally disposed for mounting said support means on a vertical surface, said mounting means includes resilient pivot means for allowing said support means to resiliently pivot on the order of ninety degrees about a horizontal axis and return.

11. The holder system of claim 2 wherein said extended surface is spring biased mounted to a position toward the nozzle of the gun when the gun is in said support means.

12. A method of safety holding a car wash gun, having a handle, a shaft and a fluid nozzle, for washing cars and other vehicles and the like with a fluid jetting action from the gun, comprising the following steps:
 (a) providing a support means for holding and supporting the gun when out of use;
 (b) providing a movable brake means associated with said support means for moving into and out of braking engagement with the gun when in the support means; and
 (c) sensing and detecting when fluid is flowing from the gun while the gun is in said support means; and
 (d) actuating said movable brake means against the gun to prevent jetting of the gun from said support means if and when the fluid jetting action occurs when the gun is in said support means.

13. The method of claim 12 wherein there is further included the steps of:
 providing a movable extended surface positioned at the lower part of said support means below and in front of the position the fluid jet nozzle of the gun occupies when the gun is in said support means, with said extended surface being movable away from the nozzle under the jetting force of any fluid in a direction away from the nozzle;
 providing mechanical linkage elements connected to said extended surface and to said brake means; and
 allowing the movement of said extended surface means as a result of any fluid jetting from the gun nozzle to move said brake means through said linkage elements into frictional resistance engagement with the gun to prevent it from jetting out of said support means.

* * * * *